| | | | |
|---|---|---|---|
| United States Patent [19] | | [11] | 3,961,943 |
| Schell, Jr. | | [45] | June 8, 1976 |

[54] PROCESS FOR RECOVERING PALLADIUM

[75] Inventor: Joseph G. Schell, Jr., Baton Rouge, La.

[73] Assignee: The Dow Chemical Company, Midland, Mich.

[22] Filed: Apr. 18, 1975

[21] Appl. No.: 569,628

[52] U.S. Cl. ............................. 75/108; 75/101 R; 75/121; 75/.5 A; 252/412
[51] Int. Cl.² ...................................... C22B 11/04
[58] Field of Search .............. 75/108, 121, 101 R, 75/.5 A; 252/412

[56] References Cited
UNITED STATES PATENTS

| | | | |
|---|---|---|---|
| 3,443,933 | 5/1969 | Boyhan | 75/108 |
| 3,471,567 | 10/1969 | Gourlay | 75/108 UX |
| 3,488,144 | 1/1970 | Sargent | 75/108 UX |
| 3,655,363 | 4/1972 | Tsutsumi | 75/101 R |
| 3,656,939 | 4/1972 | Boehm et al. | 75/108 |

*Primary Examiner*—G. Ozaki
*Attorney, Agent, or Firm*—Stephen Hoynak; Glwynn R. Baker

[57] ABSTRACT

The inactive palladium-containing precipitate formed during the reaction of a carboxylic acid and an olefin to form an ester can be reactivated by the addition of a suitable reducing agent to a slurry of the precipitate in the ester.

10 Claims, No Drawings

PROCESS FOR RECOVERING PALLADIUM

BACKGROUND OF THE INVENTION

It is known that mono- and diesters of alkylene glycols can be synthesized by reacting a carboxylic acid with an olefin and a nitrogen-oxygen containing compound; using a soluble palladium compound as a catalyst. During the reaction, the palladium compound gradually reacts with ingredients of the reaction system to form an insoluble palladium-containing precipitate which is catalytically inactive.

The precipitate is insoluble in organic solvents and in most mineral acids. It is soluble in aqua regia, but the use of this solvent is not commercially desirable. The precipitate is also soluble in strong aqueous alkaline media.

One method of recovering palladium from the precipitate is described in U.S. Pat. No. 3,655,363. The procedure consists of dissolving the precipitate in aqueous alkali metal hydroxide, alkali metal cyanide or ammonia. The palladium-containing mixture is then reduced to metallic palladium with hydrazine, hydrogen or formaldehyde. Then metallic palladium is recovered by filtration. A process which eliminates the isolation of the precipitate formed during the formation of the monoester and the filtration and recovery of the reduced palladium thereafter is desirable, since it would decrease the palladium loss and also decrease the number of steps in the reactivation procedure.

SUMMARY OF THE INVENTION

The present invention provides a simplified process for converting the inactive palladium-containing complex, formed during the process of making alkylene glycol monoester or diesters, or a mixture of such esters, from a carboxylic acid and an olefin, to metallic palladium by adding a palladium reducing agent to the reaction mixture containing the inactive palladium complex. The reducing agent can be hydrogen or hydrazine. No alkaline or alkali metal compound is added to the mixture for the reduction step.

The ester is liquid at room temperature and is preferably the reaction product of a lower alkyl carboxylic acid (2–5 C atoms) and a lower olefin (2–5 C atoms).

The temperature at which the reducing reaction takes place depends in part on the reducing agent employed, in part on the time during which the reaction is run and in part on the ratio of palladium-containing compound to reducing agent. Thus, with hydrazine as the reducing agent a temperature range of from about 0°C to about 300°C is operable, but a preferred temperature range is from about 50°C to about 150°C. With hydrogen as the reducing agent, the temperature range can be from about 0°C to about 300°C, preferably from about 90°C to about 150°C.

The time of reaction can range from about 5 to about 300 minutes, preferably from about 30 to about 120 minutes.

The molar ratio of palladium to hydrazine can range from about a slight excess of hydrazine to about 19 mol excess e.g. about 20 moles hydrazine to 1 mol of palladium. A preferred mol ratio of hydrazine to palladium is about 15–20 to 1, and a most preferred ratio is about 17–18 to 1.

When hydrogen is the reducing agent, the reaction is preferably run in a manner such that an excess of $H_2$ is present during the entire reducing period.

With either reducing reagent the entire amount of reducing agent can be added at one time, or incrementally or as a steady stream.

Pressure of reaction does not have any effect on the hydrazine reduction step and only a slight effect when hydrogen is the reducing agent. However, when hydrogen is employed it is preferred to employ a pressure above atmospheric to assure greater contact between the solid in the slurry and the reducing gaseous hydrogen. If a batch operation is employed in which sufficient hydrogen to complete the reaction is used, the pressure must be sufficiently high to provide the molar ratio requisite for the reduction to metallic palladium. Thus, although there is no upper limit for hydrogen pressure, practical considerations dictate a preference of from about 50 psig to about 250 psig.

The process of this invention can be practiced either by a batch operation in which the slurry concentrate, after completion of the glycol monoester formation and separation of a major portion thereof from the solids, is subjected to the reaction of reducing the inactive, insoluble precipitate to palladium metal. In the alternative, it is also possible to remove, continuously, a portion of the inactive palladium complex from the glycol monoester reaction system, reduce the inactive complex to palladium metal and return the active catalyst to the glycol monoester reactor system.

The Examples which follow are intended to illustrate but not limit the invention. All parts are by weight, unless otherwise specifically indicated.

EXAMPLE 1

Propylene glycol monoacetate was made by the known process of reacting a mixture of glacial acetic acid, lithium nitrate and propylene, using sodium palladium chloride as a catalyst. During the reaction a yellow, palladium-containing precipitate, which is catalytically inactive for the reaction, is formed.

A slurry of 0.751 gram of the yellow precipitate in 10 ml of propylene glycol monoacetate was prepared. To the slurry were added 3.24 ml of a 50 weight percent aqueous solution of hydrazine. The hydrazine-palladium mol ratio was 17.3. The mixture was heated to 70°C and stirred for 30 minutes. The black solid was filtered. Hot (70°C) nitric acid dissolved the palladium metal but not the small amount of yellow solid. The mixture was filtered, the filtrate was dried overnight at 85°C under a 15 inch vacuum. The residue weight 0.017 gram. Thus, 98 percent of the palladium was recovered by the procedure.

It is readily apparent that, after reduction with hydrazine, the slurry can be returned to the reaction mixture wherein the palladium metal will dissolve in the acetic acid, and the formation of the glycol monoester can be continued. The solution in nitric acid was made to determine the effectiveness of the reducing procedure.

When this procedure was repeated with varying ratios of hydrazine to palladium the following results were obtained:

TABLE I

| Hydrazine to Palladium Ratio | Percent Palladium Recovery |
|---|---|
| 1.25 | 39 |
| 5.75 | 42.5 |
| 11.5 | 93 |

For comparative purposes, the procedure of U.S. Pat. No. 3,655,363 was followed, by first dissolving the precipitate in 4N NaOH and then reducing with varying molar ratios of hydrazine for 30 minutes at 70°C. The data obtained are tabulated below:

TABLE II

| Hydrazine to Palladium Ratio | Percent Palladium Recovery |
| --- | --- |
| 1 | 60 |
| 4.25 | 65 |
| 8.5 | 63 |
| 13 | 65 |

The data show that recovery of palladium in alkaline solution was fairly uniform at 60–65 percent over a large range of hydrazine to palladium ratio.

A corresponding diester of the glycol or a mixture of mono- and diester in any proportion can be substituted for the monoester of the example.

EXAMPLE 2

A slurry of 2.20 gram of the catalytically inactive, palladium-containing yellow solid was prepared in 20 ml of propylene glycol monoacetate. The slurry was then subjected to reductive treatment with hydrogen at 200 psig at 113°C for 2 hours. A recovery of 81 percent of the palladium was obtained.

When hydrogen is the reducing agent, increases in time and temperature, or both, have a larger effect in increasing the yield of palladium than an increase of hydrogen pressure alone. However, at a given time and temperature, increasing hydrogen pressure will also increase yield of palladium slightly.

I claim:

1. A method of converting an inactive palladium-containing complex, formed during the process of making an alkylene glycol monoester from a carboxylic acid and an olefin, to metallic palladium, said method comprising reducing at least a portion of said palladium-containing complex to metallic palladium by adding hydrazine or hydrogen to a slurry of said palladium-containing complex and an alkylene glycol ester.

2. The method of claim 1 in which the reducing agent is hydrazine in a molar ratio of from 1 to about 20 mols per mole of palladium, and in which the temperature ranges from about 0°C to about 300°C.

3. The method of claim 2 in which the temperature is about 70°C and the reaction time is from about 15 to about 120 minutes.

4. The method of claim 2 in which the mole ratio of hydrazine to palladium ranges from about 11 to about 18.

5. The method of claim 2 in which the mole ratio of hydrazine to palladium is about 18, the temperature is about 70°C, the reaction time is about 30 minutes and the liquid in the slurry, is propylene glycol monoacetate and recovering about 98 percent of the palladium in the complex.

6. The method of claim 1 in which the reducing agent is hydrogen and the temperature is from about 0°C to about 300°C.

7. The method of claim 6 in which the hydrogen pressure is at least about 100 psig.

8. The method of claim 7 in which the temperature ranges from about 90° to about 150°C.

9. The method of claim 8 in which the temperature is about 113°C and the reaction time is about 2 hours.

10. The method of claim 6 in which the reducing reaction is carried in propylene glycol monoacetate, the temperature is about 113°C, the hydrogen pressure is about 200 psig and reaction time is about 2 hours.

* * * * *